Jan. 3, 1950     S. CRUM ET AL     2,493,476
CONTROL APPARATUS
Filed April 30, 1945     3 Sheets-Sheet 2
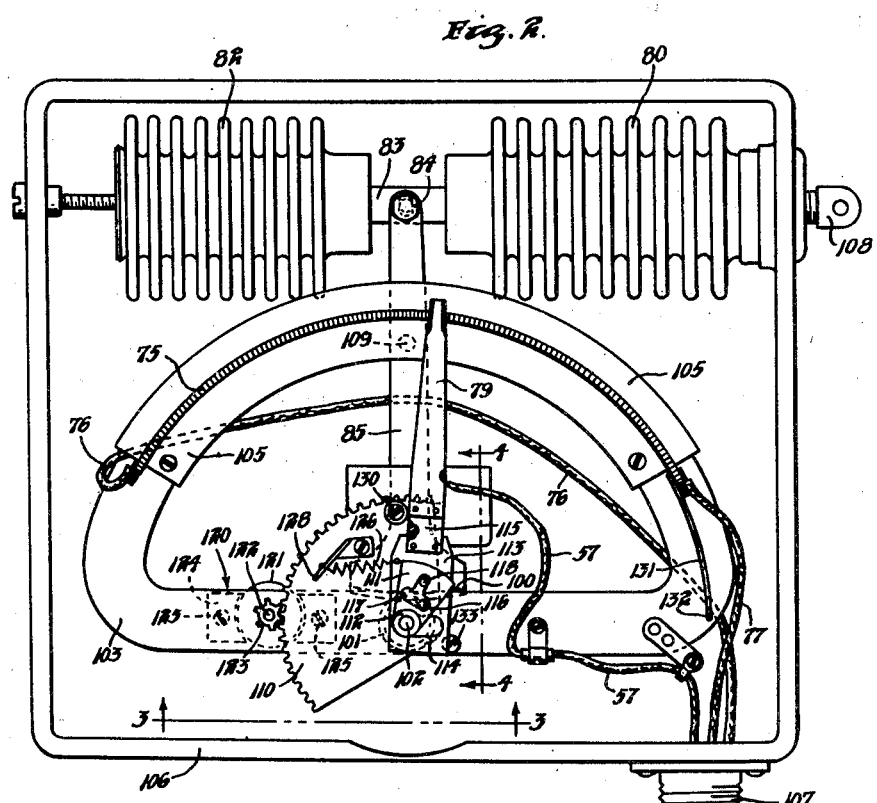
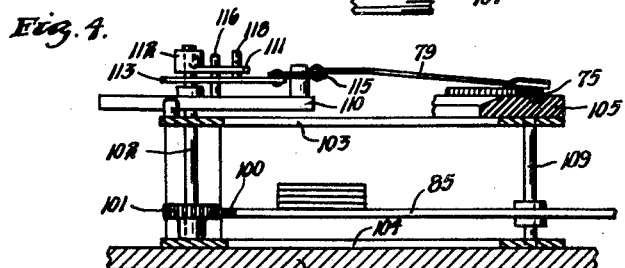
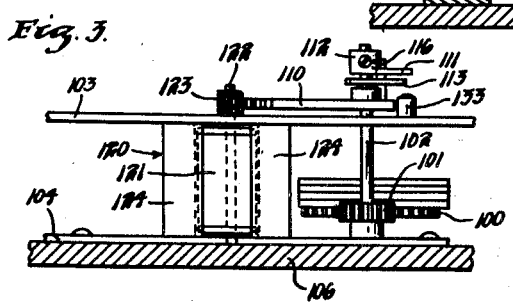
INVENTORS
STEPHEN CRUM
HARRY W. SANDHOFF
BY *George H. Fisher*
ATTORNEY

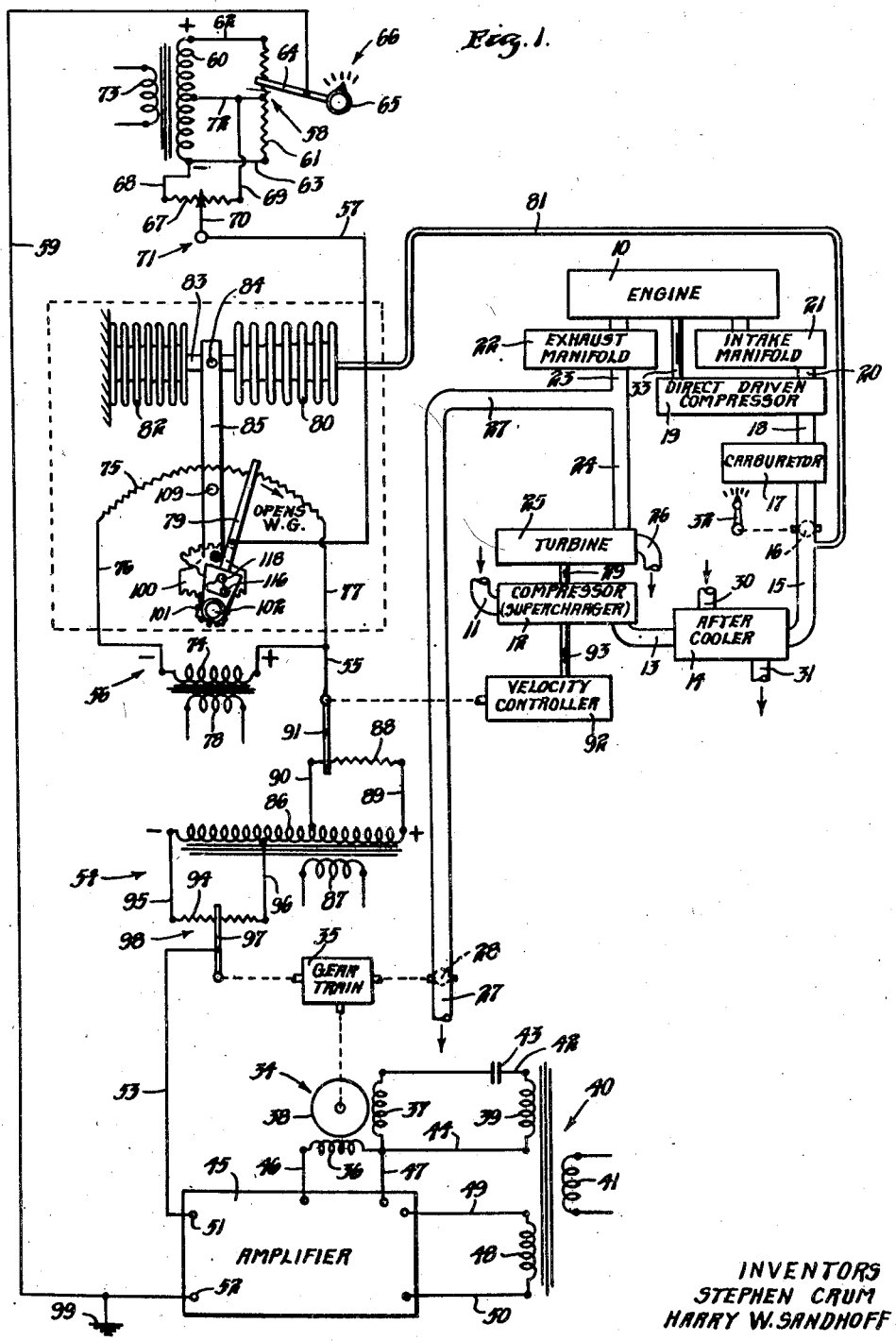

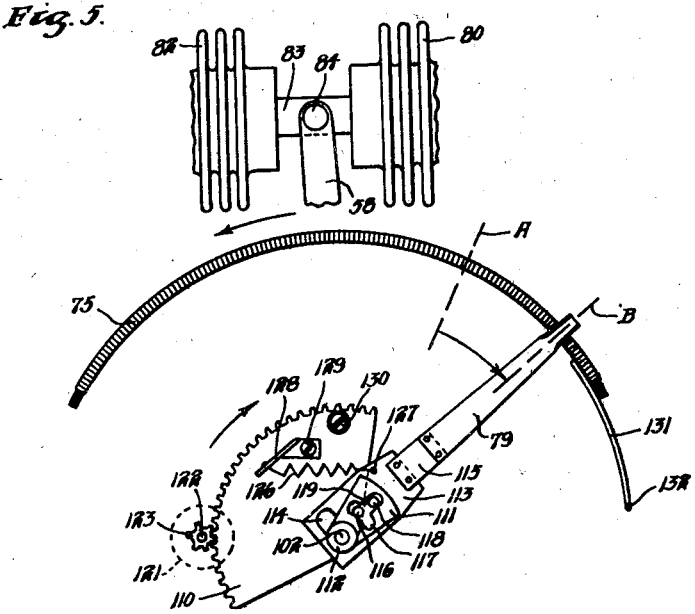

Patented Jan. 3, 1950

2,493,476

UNITED STATES PATENT OFFICE 2,493,476

CONTROL APPARATUS

Stephen Crum, Minneapolis, and Harry W. Sandhoff, St. Louis Park, Minn., assignors to Minneapolis-Honeywell Regulator Company, Minneapolis, Minn., a corporation of Delaware Application April 30, 1945, Serial No. 591,156

21 Claims. (Cl. 230—5)

This invention relates to improvements in electrical control apparatus.

The invention has particular reference and application to that type of electrical control apparatus wherein a normally balanced electrical network is used. Such a system ordinarily has one section or portion which includes a sensing or control resistance of the potentiometer type, the wiper or slider of which is positioned by and senses variations in the condition to be controlled and acts in response to such sensed variations in the condition, to unbalance the network so that a voltage is developed which may be used to vary the condition and restore it to a selected value. Such a system ordinarily embodies other control and balancing resistances as will later appear herein, but it is in connection with the sensing resistance that our present invention is chiefly concerned.

The present invention is furthermore particularly adapted to control apparatus of this nature which is used in connection with and for the control of the turbo-supercharger of an internal combustion engine, such as the engine of an aircraft. In such installations the condition to be controlled is the induction system or carburetor inlet pressure of the air supplied for combustion in the engine, by operation of the supercharger. This unit is ordinarily a centrifugal type compressor which takes in air from the atmosphere, compresses it and delivers it to the engine; the rate of compression varying according to the speed of the compressor. For driving the compressor, a turbine is employed and the turbine is powered by exhaust gases from the engine, a variable volume of such gases being directed through the turbine under the control of a bypass valve, called a waste gate, in the turbine outlet. The position of the waste gate precisely determines the operating speed of the turbine and compressor and the waste gate is positioned by a reversible electric motor controlled by the unbalance voltage developed when the network, previously referred to, is unbalanced for any reason.

The turbine and compressor in such systems operate frequently at very high speeds and this is particularly true in the case of aircraft during flight at high altitudes whereat the rarefied atmosphere must be highly compressed in order to provide a sufficient volume of air for combustion in the engine. It is necessary, therefore, in order to prevent damage to the turbine and compressor to provide means for limiting the rate of acceleration thereof, in its attempt to meet the demand for an increase in induction system pressure. What is needed obviously is some means for compensating the sensing controller for rate of change of the induction system pressure to the end that a sudden surge of such pressure, indicative of a too rapid rate of acceleration of the turbine and compressor, will instantly introduce a condition of unbalance into the network such as to call for the waste gate to open faster than its normal rate under a gradual pressure change, and reduce the operating speeds of these parts.

It is the primary object of our invention, therefore, to provide a sensing or control resistance of such nature that a surge or rapid increase of the sensed condition will so actuate the wiper or slider of the resistance as to cause it to instantly assume a position far in advance of the normal position which would be called for by an equal increment of pressure if occurring slowly, in order to unbalance the network, at least momentarily, to a degree such as to call for the waste gate, or other controlling factor, to rapidly counteract the surging tendency and bring the turbine's rate of acceleration down to an allowable rate.

A further object is to provide in such an apparatus means for eliminating the greater than normal unbalance of the system caused by the rapid shooting movement of the wiper or slider and bring it back toward the position normally called for by the change in the sensed condition and thus position the waste gate more slowly as the turbine and compressor are brought under control.

These and other more detailed and specific objects will be disclosed in the course of the following specification, reference being had to the accompanying drawing, in which Figure 1 is a diagrammatical showing of a complete engine, induction and exhaust system with a turbo-supercharger and showing our invention applied to the control system thereof.

Figure 2 is an enlarged elevation of a complete sensing or control resistance unit constructed in accordance with our invention.

Figure 3 is a fragmentary edge view along the line 3—3 of Figure 2, a part of the case being shown in section.

Figure 4 is a fragmentary sectional view along the line 4—4 in Figure 2.

Figure 5 is a detail view showing the manner in which the slider is caused to shoot in one direction due to a surge in the sensed condition, beyond the position which it would normally assume by a more gradual but otherwise corresponding change in the condition.

Figure 6 is a similar view but illustrating the manner in which the slider returns toward normal position as the overacceleration tendency of the controlled parts is wiped out.

Figure 1

Referring now more particularly to Figure 1, we show therein an engine 10, which may be the engine of an aircraft. Air for supporting combustion in the engine passes from an intake 11 through a compressor 12, a conduit 13, an aftercooler 14, a conduit 15, a throttle 16, a carburetor 17, a conduit 18, a direct driven compressor 19, a conduit 20, and an intake manifold 21 into the engine.

The exhaust gases from the engine issue from an exhaust manifold 22 and are discharged through a duct 23 having a branch 24 leading to a turbine 25. The turbine is provided with an outlet 26 through which the exhaust gases may escape to atmosphere after passing through the turbine. The conduit 23, commonly termed the exhaust stack, also has a by-pass outlet 27 to atmosphere, and controlling the flow of exhaust gases from this outlet is a damper or valve 28 known as the waste gate.

The compressor 12 is driven from the turbine 25 through a shaft 29 and the air compressed in this compressor 12 passes through the aftercooler 14, wherein the heat of compression is at least partly removed by passing fresh air from an intake 30 in heat exchanging relation with the compressor discharge air, after which the cooling air is delivered at the outlet 31.

The throttle 16 may be adjusted by the hand control 32, and in the carburetor 17 fuel from a supply (not here shown) is mixed with the air to form a combustible gas.

The compressor 19 is directly driven from the engine by shaft 33 and is utilized not only as a compressor but also to evenly distribute the mixture of fuel and air to all cylinders of the engine.

The waste gate 28 is driven by a motor 34 through a gear train 35. The motor 34 is of the split-phase type, being provided with a pair of field windings 36 and 37 which are spaced 90 electrical degrees apart, and an armature 38. The field winding 37 is supplied with electrical energy from a secondary winding 39 of a transformer 40 having a primary winding 41 which is connected to a suitable source (not here shown) of alternating current. The energizing circuit for the winding 37 may be traced from the upper terminal of the transformer winding 39 through a conductor 42, a phase shifting condenser 43, the field winding 37, and a conductor 44 to the lower terminal of the secondary winding 39.

The flow of electrical energy to the motor field winding 36 is controlled by an electronic amplifier 45 to which the winding is connected by conductors 46 and 47. The amplifier 45 is powered from another secondary winding 48 on the transformer 40 to which the amplifier is connected through conductors 49 and 50.

The amplifier 45 is provided with a pair of input terminals 51 and 52 and operates to supply the field winding 36 of the motor with alternating current the phase of which depends upon the phase of an alternating current signal potential impressed across these input terminals 51 and 52. Any suitable form of amplifier in which there is a fixed relation between the phase of the input and the output voltages may be used. A suitable amplifier of this type is shown in Figure 1 of the co-pending application of Albert P. Upton, Serial No. 437,561, filed April 3, 1942, now Patent No. 2,423,534, dated July 8, 1947.

It will be evident that if the motor field winding 36 is supplied with alternating current which leads the current in the other field winding 37 by ninety electrical degrees the motor will rotate in one direction, whereas if the current in winding 36 lags the current in winding 37 by this amount, the motor will rotate in the opposite direction.

The phase of the signal applied to the amplifier input terminals 51 and 52 is determined by the electrical conditions existing in a compound network which consists of three main separate networks connected in series. The circuit between the amplifier input terminals may be traced from terminal 51 through a conductor 53, a first electrical network 54, a conductor 55, a second electrical network 56, a conductor 57, a third electrical network 58, and a conductor 59, back to the input terminal 52.

The network 58 includes a transformer secondary winding 60 across the terminals of which is connected a slide-wire resistance 61 by means of conductors 62 and 63. The conductor 59 is connected to a slider 64 which cooperates with the resistance 61 and which is adjustable thereacross by means of a control knob 65. The resistance 61 and slider 64 together form a control point adjuster 66 or manual selector for the intake manifold pressure control system.

Another slidewire resistance 67 is connected across one-half of the transformer secondary winding 60 by a conductor 68 connected to a lower terminal thereof and a conductor 69 connected to a center tap on the winding. A slider 70 cooperates with the resistance 67 to form a calibrating potentiometer designated generally at 71. The center tap of the winding 60 is connected by a conductor 72 to the center of the resistance 61 to prevent the potential distribution along resistor 61 from being affected as much by changes in current flow therethrough due to relative movement of sliders 64 and 70.

The transformer carrying said secondary winding 60 has also a primary winding 73 which is connected to the same source of alternating current energy as that to which the aforesaid primary winding 41 is connected.

The network 56 comprises a secondary winding 74 across the terminals of which is connected a slidewire resistance 75 of the potentiometer type, by means of conductors 76 and 77. A primary winding 78 is also provided on this transformer and is connected to the aforesaid source. Cooperating with the resistance 75 is a slider or wiper 79 which is positioned in accordance with and senses the pressure at the inlet to the carburetor 17. For this purpose there is provided a bellows 80 the interior of which is connected by a duct 81 to the conduit 15 so that air under pressure as supplied by the compressor 12 is conducted to the interior of the bellows. A compensating bellows 82 is provided and is supported in spaced relation to the bellows 80, the free ends of the two being connected by a link 83 to which is pivoted at 84 an arm 85 which is operatively arranged to move the wiper 79. The bellows 82 is evacuated and spring loaded so as to respond solely to atmospheric pressure. This bellows acts to compensate for changes in atmospheric pressure. At this point the actual operating connections between the arm 85 and wiper 79 will not be described and it is sufficient to state that the arrangement, as thus far described, is conventional, and operates to move the wiper 79 to the right along resistance 75 in response to an increase in carburetor inlet pressure and to move the wiper to the left in response to a decrease in such pressure. Obviously the pressure sensing or take-off duct 81 may be connected to any point along the induction system of the engine which may be desired.

The conductor 57 connecting networks 56 and 58 is connected between the wipers 70 and 79.

The network 54 comprises a transformer secondary winding 86 energized by a primary winding 87 connected to the aforesaid source of alternating current electrical energy. A slidewire resistance 88 is connected by a conductor 89 to the right-hand terminal of the secondary winding 86 and by another conductor 90 to an intermediate point or tap on the winding. A slider 91 cooperates with the resistance 88 and is connected through the conductor 55 to the right-hand terminal of the secondary winding 74 of the network 56. The resistance 88 and slider 91 together form a velocity compensating controller and the slider is positioned by any suitable velocity responsive device 92 driven by a shaft 93 from the turbine 25. The slider 91 moves to the right from its normal position at the left-hand end of the resistance 88 if the velocity of the turbine exceeds a predetermined safe maximum value.

Network 54 further includes a slidewire resistance 94 connected by a conductor 95 to the left-hand terminal of the secondary winding 86 and by another conductor 96 to an intermediate tap on the winding. A slider 97 cooperates with the resistance 94 and is connected to the aforesaid conductor 53 leading to amplifier input terminal 51. The resistance 94 and slider 97 together form a follow-up potentiometer 98 and the slider is positioned by the gear train 35, the slider movement being thus concurrent with that of the waste gate 28.

The system as thus far described is essentially identical to that disclosed in the co-pending application of Hubert T. Sparrow, Serial No. 476,797, filed February 22, 1943, now Patent No. 2,477,668, dated August 2, 1949, in which application the system and its operation are set out in detail. The operation will be only briefly described herein and sufficiently to point out the need for the present invention.

It will first be evident that, with the primary windings 41, 73, 78 and 87 all connected to a proper alternating current source, the alternating potentials at the respective terminals of the secondary windings of the networks will be in phase with each other. The signal potential impressed across the amplifier input terminals 51 and 52 will thus be the algebraic sum of the potentials developed by the three networks 54, 56, and 58. For convenience in this description, the potential conditions existing during a half cycle at which the secondary windings 60, 74, and 86 have the polarities indicated by the legends will be discussed. For a reference, the conductor 59 is indicated as grounded, as at 99, or at zero potential with respect to ground.

In the network 58, then, the slider 64 in the position shown is at a positive potential with respect to the center tap on the winding 60 while slider 70 being at a midpoint along resistance 67 is at a negative potential with respect to said center tap. This network is thus seen to introduce a potential into the series circuit such that conductor 57 is negative with respect to the grounded conductor 59.

In the network 56, the slider 79 is also negative with respect to grounded conductor 59 while the conductor 55 being connected to the positive terminal of the secondary winding 74 is positive with respect to the slider. The relative magnitudes of the negative and positive potentials depend upon the position of the slider 79 along resistance 75 and for convenience in this description, it may be assumed that the position here shown is such that the conductor 55 is at a positive potential with respect to grounded conductor 59.

Considering finally the network 54 it will be evident that with the slider 91 in its normal position at the left-hand end of resistance 88 the conductor leading to the tap on secondary winding 86 is at the same positive potential to ground as conductor 55. The resistance 94 being connected between a point along winding 86 adjacent that to which conductor 90 is connected and the negative terminal of the winding, the slider 97 is then negative with respect to the conductor 90 by a value determined by the position of the slider along said resistance. For convenience, it is assumed that the negative potential of the slider 97 with respect to conductor 55 is equal to and exactly opposes the positive potential of the conductor 55 with respect to grounded conductor 59.

Under these conditions the conductor 53 is at the same potential as grounded conductor 59 and with no potential difference across the amplifier input terminals 51 and 52 no signal is applied to the amplifier and the network is exactly balanced. It will be evident, however, that a change in the position of any one or all of the sliders 64, 70, 79, 91 or 97 will disturb the balanced condition and will result in the development of a signal potential at the amplifier of a phase depending on the direction in which such unbalance occurs.

For an example of the effect of an unbalance in the network particularly pertinent to the present invention, consider the effect of a rise in pressure in the induction system of the engine. Such a rise is immediately reflected in an expansion of the bellows 80 and this action moves the slider 79 to the right along the resistance 75. The slider thus approaches more nearly the same potential as that of the right-hand (positive) terminal of the secondary winding 74, or in other words, the magnitude of the positive potential introduced into the series circuit by this network 56, previously described, is reduced to the point where it is insufficient to exectly cancel out the sum of the negative potentials introduced by the networks 54 and 59. As a result, a signal potential appears across the amplifier input terminals 51 and 52 with a polarity such that terminal 51 is positive with respect to the grounded terminal 52. It is assumed that the amplifier 45 and motor 34 are properly connected so that the amplifier responds to a signal of this polarity to supply the motor field winding 36 with an alternating current potential of proper phase to cause the motor to rotate in a direction opening the waste gate 28. Such opening movement of the waste gate 28 reduces the operating speed of the turbine 25 and that of the compressor 12 so that the pressure of the air supplied to the engine is decreased.

At the same time the slider 97 is moved along resistance 94 towards the right, concurrent with the movement of the waste gate 28, and the direction of this movement is such as to introduce a balancing negative potential into the series network which will at a proper moment balance out the positive potential introduced by the rise in pressure as aforesaid. As this occurs, the waste gate opening signal at the amplifier is wiped out and the system comes to rest again but with the waste gate at a new position.

A decrease in the induction system pressure will obviously act in a similar but opposite manner, the collapsing bellows 80 moving the slider 79 to the left and introducing a waste gate closing signal of negative potential at the amplifier, which signal is ultimately balanced out by the rebalancing action of the follow-up potentiometer 98.

If the manual controller 64 is moved downwardly to call for higher pressures, it will be apparent that the effect is to make conductor 59 less positive with respect to conductor 57 than was previously the case. If the system is otherwise balanced, this will result in terminal 52 of the amplifier being negative with respect to terminal 51 during the conductive half cycle. This, it will be recalled, causes the waste gate to be moved towards closed position to increase the induction system pressure. Obviously, a movement of slider 64 upwardly causes the waste gate to be moved towards open position to decrease the induction system pressure.

If at any time the speed of the turbine becomes excessive, slider 91 is moved to the right with respect to resistor 88. This causes conductor 55 to become more positive with respect to conductor 53 than previously. If the system is otherwise balanced, this causes input terminal 52 to be positive with respect to input terminal 51. This results in a signal being supplied to motor 34 of such phase as to drive the waste gate towards open position to reduce the speed of the turbine.

Heretofore systems of this nature have been provided, in addition to the controls herein shown, with an acceleration compensating controller (not shown) operating off the shaft of the turbine 25 and controlling a potentiometer in the network in a manner similar to the velocity controllers 88, 91 and 92. The purpose of such control was, of course, to introduce a waste gate opening potential or signal into the system as the turbine's rate of acceleration exceeded a safe value. In accordance with our present invention we eliminate the necessity for a separate control of this character, with its attendant complications, and substitute therefor an acceleration compensating effect on the slider 79 as will now be described.

*Figures 2-6*

In accordance with conventional practice, the operating arm 85 for the slider 79 is provided at its end with a gear sector 100 (best shown in Figures 3 and 4) which meshes with a gear 101 provided on a shaft 102 journaled through and between a pair of spaced frame members 103 and 104. The resistance 75 is of the slidewire type and is embedded in an insulating member 105 secured to the upper frame member 103, the resistance being arcuate in shape so that the slider will remain in contact as it swings about a pivot centered near the shaft 102. Ordinarily the slider 79 is secured to this shaft 102 to turn therewith as the shaft is oscillated on its axis by the gear sector 100 and gear 101 responsive to movement of the bellows 80. The entire assembly, including the bellows 80 and 82, is mounted in a case or housing 106 of any suitable kind, to which the frame member 104 is secured as seen in Figure 3. The conductors 57, 76, and 77 may be brought out then to a conventional connector unit 107 for connection to the other parts of the network, while the connection to the duct 81 supplying the induction system pressure to bellows 80 may be made through a conventional fitting 108. The operating arm 85 oscillates about a pivot pin 109 connecting the frame members 103 and 104.

Instead of fastening the slider 79 to the shaft 102 directly, we provide an expandible connection which will now be described.

A gear sector 110 is journaled on the shaft 102 immediately over the frame member 103. A short operating lever 111 is secured, by its collar 112, to the end of the shaft 102 to turn therewith, the lever 111 being spaced from the gear sector 110. The inner or pivoted end of the slider 79 fits loosely between the gear sector 110 and lever 111 and this end of the slider has a comparatively wide end plate 113 which is slotted at 114 to loosely receive the shaft 102 and permit freedom for movement of the slider independently of said shaft. The end plate 113 is connected to the slider 79 itself by an insulating strip 115 so that the slider is not grounded to case or frame parts of the controller.

The actual pivot for the slider 79 is a bearing pin 116 (best shown in Figures 4, 5, and 6) which is secured to the gear sector 110 at a point spaced from the axis of the shaft 102 so that the slider movement with respect to sector 110 is effectively eccentric with respect to said axis. The extremity of this pivot or bearing pin 116 is loosely received in a slot 117 in the operating lever 111, so that the lever and slider may have freedom for limited relative swinging movements.

Connecting the operating lever 111 and the end of the slider 79 is an actuating or wrist pin 118 (best shown in Figures 4, 5, and 6) which is secured on the slider end plate 113 and extends through a slot 119 in the lever 111, which slot may be a continuation of the aforesaid slot 117. The pin 118 is spaced further outwardly from the axis of the shaft 102 than is the bearing pin 116, as clearly shown, and the slot 119 in the lever 111 to clear the wrist pin is elongated in a substantially radial direction to compensate for the differences in leverages involved and permit necessary inward and outward movement of the pin with respect to the slider as the slider pivots about bearing pin 116.

The gear sector 110 is retarded in its movement about the shaft 102 by a magnetic damper or eddy current brake unit 120. This unit comprises a rotor 121 journaled by a shaft 122 between the frame members 103 and 104 with the shaft extended through the former in position to support a small pinion 123 in mesh with the gear sector. The rotor 121 operates between field magnets 124 secured, as indicated at 125, between the frame members 103 and 104. Rotation or oscillation of the gear sector 110 of course results in a fairly rapid rotary movement being transmitted to the rotor 121. Rotation of the latter is, however, damped or braked by the interacting magnetic fields which are set up so that the speed at which the gear sector may move is retarded. Magnetic dampers, of this type and for these purposes, are well known in the art.

The slider 79 is biased in one direction, to the left or in a waste gate opening direction, as viewed in the drawings, by a light retractile coil spring 126 which is hooked at 127 (Figure 5) to the slider end plate 113 and stretched to an adjustment arm or bracket 128 on the gear sector 110. Obviously, by loosening the screw 129, the arm 128 may be swung about to vary the tension on the spring 126. A stop or bumper 130 is provided on the gear sector 110 in position to engage the slider 79 and limit the movement of the slider 79 under influence of said spring.

Operation

Assuming the parts to be in a normal position, for a certain induction system pressure, in Figure 2, the action will first be considered as resulting from a gradual rise of induction system pressure. As this occurs, the oscillating movement of the arm 85 will result in a clockwise movement of the shaft 102 and of the short operating lever 111 connected thereto. The movement of the latter, through action on the actuating pin 118 will carry along the slider 79 moving it toward the right along the resistance 75, and as hereinbefore described, thus supplying a waste gate opening signal to open the waste gate 28, reduce the turbine speed and gradually bring the induction system pressure back to selected value.

In this operation the slider 79 of course swings slightly about the bearing pin 116 stretching the spring 126 which acts then to bias the gear sector 110 for movement in a clockwise direction and if the rate of advance of the slider is not too great the magnetic damper 120 will allow the gear sector to follow-up the movement retaining the parts at or near their normal positions.

A decrease in induction system pressure, on the other hand, will simply turn the shaft 102 in a counterclockwise direction and the corresponding movement of the lever 111 will carry along the wrist pin 118 and swing the slider 79 toward the left. In this operation the slider, bearing against the bumper 130, forces the gear sector to turn in a counterclockwise direction so that the parts maintain their normal relationship and the controller operates in this direction in exactly the same manner as though the slider 79 were connected directly to the shaft 102 as it ordinarily is. Such movement of the slider will, of course, cause the network to develop a signal potential of proper polarity to call for the waste gate 28 to close and build up the pressure again.

Consider now, however, the action of our controller if the induction system pressure suddenly increases or surges. Such a condition is, of course, an immediate indication of a corresponding too rapid rate of acceleration of the turbine and compressor which must be brought under control before damage occurs.

The first result of such a pressure surge is a sharp expanding movement of actuating bellows 80 and a concurrent rapid movement of the shaft 102 and operating lever 111 in a clockwise direction, as seen in Figure 5. The ensuing effect of the lever 111 upon the actuating pin 118 swings the slider 79 about its bearing pin 116 but at a rate much too rapid for the damped or retarded gear sector 110 to follow. As a result the bearing pin 116 remains comparatively fixed and the swinging movement of the operating lever 111 then acts about the comparatively short radius or leverage existing between the pins 116 and 118 upon the slider 79, swinging the same through a greater angle, or through a relatively greater number of degrees, than the operating lever 111 itself moves. This condition is illustrated in Figure 5 wherein it will be noted that the slider and its end plate 113 are moved to the right beyond their normal angle with respect to the operating lever 111, shown in Figure 1. The slots 114 and 117 provide the necessary clearance for this action.

What actually occurs then is that the slider 79 moves, under these conditions, beyond the position A in Figures 5 and 6 normally called for by a corresponding increase in induction system pressure if it took place more gradually, to an advance position B. The wide swing of the slider thus momentarily unbalances the network to a degree much greater than normally called for and a waste gate opening signal of a magnitude such as to call for the waste gate to be opened sharply results. This action obviously will reduce the turbine speed so rapidly as to prevent overacceleration and bring the turbine back under control.

As this oversignal is developed and the waste gate 28 is thrown toward open position to compensate for the overaccelerating condition, the added signal is removed gradually by the return effect of the expandable connection. Thus as the slider 79 is swung to the right or shoots ahead as described, the rate of such movement is too great for the retarded gear sector 110 to follow and the spring 126 is thus placed under tension as seen in Figure 5. As the slider and connected parts lose momentum then the spring 126 reasserts itself to draw the slider back toward the left but in the meantime the spring tension and bias on the gear sector 110 causes it to advance also in the clockwise direction as indicated in Figure 6. A condition is quickly assumed then at which the slider 79 is drawn back to about the position A normally called for by the increased induction system pressure and the parts reassume their normal relative angles but in a new position. A waste gate opening signal of lesser magnitude is thus developed and the waste gate slowly opens until the pressure returns to normal or selected value.

The shooting action of the slider 79 beyond the right-hand end of the resistance 75, such as may occur when the slider is operating near this end of the resistance due to selection of high values of induction system pressure, is accommodated by the provision of an extension finger or guide 131 on the resistance, having a stop 132 turned up at its extremity.

Opposite movement of the slider toward the low pressure end of the resistance is limited by a stop 133 secured to frame member 103 in the path of the gear sector 110.

It is understood that suitable modifications may be made in the structures disclosed, provided that such modifications lie within the spirit and scope of the appended claims. Having now, therefore, fully disclosed our invention, what we claim to be new and desire to secure by Letters Patent is:

1. An electrical system for controlling a variable condition, comprising in combination, electrical means for varying the condition, an electrical network controlling said means and said means being responsive to an unbalance in said network to vary the condition, a controller forming a part of said network and responsive to a change in the condition to unbalance the network and initiate the correction of the condition, and means in said controller responsive to a rapid rate of change of the condition in one direction for momentarily unbalancing the network to a magnitude greater than that resulting from a corresponding change in the condition at a relatively slower rate or in the opposite direction.

2. An electrical system for controlling a condition, comprising in combination, a normally balanced electrical network, means responsive to an unbalanced condition of the network for varying the condition, said network including a variable impedance responsive to a change in the condition from a selected value to introduce an unbalance in the network and actuate said means to correct the condition, means operating said variable impedance in response to the rate of change of the condition in one direction to introduce a momentary condition of unbalance in the network of a magnitude greater than called for by the magnitude of the change in said condition, and means associated with said last named means for preventing the unbalance in the network exceeding that called for by the change in the condition when said condition changes in the opposite direction.

3. An electrical system for controlling the induction system pressure of an internal combustion engine including a turbo-supercharger and means controlling the speed thereof, comprising in combination, a normally balanced electrical network, means responsive to an unbalanced condition in the network for adjusting said controlling means, a variable impedance in said network responsive to a change in the induction system pressure to unbalance the network and cause said controlling means to correct the pressure, and means actuating the variable impedance in response to an increase in the perssure at a predetermined rate of change to cause the same to unbalance the network momentarily to a magnitude exceeding the magnitude of the unbalance caused by a corresponding increase in the pressure at a lower rate of change or of the unbalance caused by a corresponding decrease in the pressure at any rate.

4. An electrical system for controlling the induction system pressure of an internal combustion engine including a turbo-supercharger and means controlling the speed thereof, comprising in combination, a normally balanced electrical network, means responsive to an unbalanced condition in the network for adjusting said controlling means, a variable impedance in the network, pressure responsive means for adjusting said impedance in response to a gradual rate of change of the induction system pressure in either direction from a selected value to introduce a condition of unbalance in the network calling for the adjustment of said controlling means to restore the pressure to said selected value, and means connecting said pressure responsive means to the variable impedance to initiate operation in response to a rate of change of the pressure exceeding said gradual rate for proportionally adjusting the impedance momentarily to a condition for unbalancing the network to a degree exceeding that called for by the magnitude of the pressure change.

5. An electrical system for controlling the induction system pressure of an internal combustion engine including a turbo-supercharger and means controlling the speed thereof, comprising in combination, a normally balanced electrical network, means responsive to an unbalanced condition in the network for adjusting said controlling means, a variable impedance in the network, pressure responsive means for adjusting said impedance in response to the increase and decrease in the induction system pressure to a degree proportional to the magnitude of the change in the pressure to thereby introduce a condition of unbalance in the network sufficient to correct the change in pressure, and means responsive to the rate of change of the pressure for proportionally adjusting the impedance beyond the adjustment called for by the magnitude of the change when the rate exceeds a selected value.

6. An electrical system for controlling the turbo-supercharger of an internal combustion engine and thereby controlling the pressure of the air supplied for combustion in the engine by the supercharger, comprising in combination, electrical means for controlling the operating speed of the turbo-supercharger, a normally balanced electrical network operative when unbalanced to control said means and adjust the speed of the turbo-supercharger, a variable impedance forming a part of said network and adjustable to introduce a condition of unbalance therein, pressure responsive means for varying said variable impedance in response to a change in the pressure of the air supplied for combustion and to initiate the control of the turbo-supercharger to correct the pressure, and an expandable connection between the pressure responsive means and said variable impedance operative upon a rise in pressure at a rate of change exceeding a predetermined rate to vary the impedance to a magnitude greater than called for by the magnitude of the change.

7. An electrical system for controlling the turbo-supercharger of an internal combustion engine and controlling the pressure of the air supplied for combustion in the engine by the supercharger, comprising in combination, electrical means for controlling the operating speed of the turbo-supercharger, a normally balanced electrical network operative when unbalanced to control said means and adjust the speed of the turbo-supercharger, a variable impedance forming a part of said network and variable to introduce a condition of unbalance therein, pressure responsive means for varying said variable impedance in response to a change in the pressure of the air supplied for combustion and to initiate the control of the turbo-supercharger to correct the pressure, and a spring biased expandable connection between the pressure responsive means and said variable impedance operative in response to a surge of pressure indicative of a condition of overacceleration of the turbo-supercharger to vary the impedance rapidly and to a degree greater than called for by the magnitude of the pressure change to adjust said controlling means and counteract the overaccelerating tendency.

8. An electrical system for controlling the turbo-supercharger of an internal combustion engine and thereby controlling the pressure of the air supplied for combustion in the engine by the supercharger, comprising the combination with electrical means for adjusting the turbo-supercharger speed, a normally balanced electrical network, and an amplifier responsive to a signal developed by an unbalanced condition in said network to control said electrical means and adjust the turbo-supercharger speed in accordance with the direction and magnitude of the said unbalance, of a variable impedance forming a part of the network and responsive to a change in the pressure of the air supplied for combustion to unbalance the network and selectively apply a speed increasing or decreasing signal to the amplifier to correct the pressure, and means operating the variable impedance upon a surge in pressure to vary the impedance in the same direction as, but to an amount exceeding the variation caused by, a corresponding magnitude of pressure increase at a slower rate and to supply the amplifier with a speed reducing signal of a momentarily greater magnitude than normally called for by the pressure change.

9. An electrical system for controlling the turbo-supercharger of an internal combustion engine and controlling the pressure of the air supplied for combustion in the engine by the supercharger, comprising the combination with electrical means for adjusting the turbo-supercharger speed, a normally balanced electrical network, and an amplifier responsive to a signal potential developed by an unbalanced condition in said network to control said electrical means and adjust the turbo-supercharger speed in accordance with the direction and magnitude of the said unbalance, of a variable impedance forming a part of the network and responsive to a change in the pressure of the air supplied for combustion to unbalance the network and selectively apply a speed increasing or decreasing signal to the amplifier to correct the pressure, means operating the variable impedance upon a surge in pressure to vary the impedance in the same direction as, but to an amount exceeding the variation caused by, a corresponding magnitude of pressure increase at a slower rate and to supply the amplifier with a speed reducing signal of a momentarily greater magnitude than normally called for by the pressure change, and spring actuated means for gradually restoring the impedance substantially to the condition called for by the magnitude of the pressure change.

10. An electrical system for controlling the turbo-supercharger of an internal combustion engine and thereby controlling the pressure of the air supplied for combustion in the engine by the supercharger, comprising the combination with electrical means for adjusting the turbo-supercharger speed, normally balanced electrical network, and an amplifier responsive to a signal developed by an unbalanced condition in said network to control said electrical means and adjust the turbo-supercharger speed in accordance with the direction and magnitude of the said unbalance, of a variable impedance forming a part of the network and responsive to a change in the pressure of the air supplied for combustion to unbalance the network and selectively apply a speed increasing or decreasing signal to the amplifier to correct the pressure, overacceleration compensating means operating the variable impedance upon a surge in pressure to vary the impedance in the same direction but to an amount exceeding the variation caused by a corresponding magnitude of pressure increase at a relatively slower rate and to supply the amplifier with a speed reducing signal of a momentarily greater magnitude than normally called for by the pressure change, and means for washing out the greater than normal signal at a gradual rate as the overacceleration of the turbo-supercharger is eliminated.

11. An electrical system for controlling the turbo-supercharger of an internal combustion engine and thereby controlling the pressure of the air supplied for combustion in the engine by the supercharger, comprising the combination with electrical means for adjusting the turbo-supercharger speed, a normally balanced electrical network, and an amplifier responsive to a signal developed by an unbalance in said network to control said electrical means and adjust the turbo-supercharger speed in accordance with the direction and magnitude of the said unbalance, of a variable impedance forming a part of the network and responsive to a change in the pressure of the air supplied for combustion to unbalance the network and selectively apply a speed increasing or decreasing signal to the amplifier to correct the pressure, pressure responsive means for varying the impedance, means forming an expandable connection between the pressure responsive means and the impedance effective to vary the impedance, upon a surge of pressure, beyond the condition normally called for by gradual pressure change of corresponding magnitude, and means including a magnetic damper for slowly returning the impedance toward the said normal condition.

12. In an electrical system for controlling the pressure of the air supplied for combustion in an internal combustion engine provided with a compressor for the air powered by a turbine operated by the exhaust gases from the engine, the combination with electrical means for regulating the speed of the turbine, a normally balanced electrical network and an amplifier responding to unbalancing of the network to adjust said electrical means, of a pressure responsive controller comprising a resistance forming a part of the network, a slider for the resistance, pressure responsive means for positioning said slider in accordance with the magnitude of a change in the pressure of the air supplied by the compressor to the engine from a selected value and upon such action to unbalance the network and restore the pressure to the said value, and an expandable connection between said pressure responsive means and the slider operative when the pressure increases at a predetermined rate of change to cause said slider to advance along the resistance beyond the point called for by the magnitude of the change in pressure.

13. An electrical pressure responsive controller of the character described, comprising a variable electrical impedance, a pressure sensing bellows, and means connecting the bellows to said impedance to vary the same in either direction from a certain value in accordance with the magnitude of a pressure change affecting the bellows and to vary the impedance in one direction only in accordance with the rate of change of the pressure.

14. A pressure responsive controller, comprising in combination, a resistance, a slider movable in either direction along the resistance, a pressure sensing bellows, means connecting the bellows and slider for moving the slider in one direction responsive to an increase in pressure and in the other direction responsive to a decrease in pressure, and said means including an expandable connection operative to permit the slider to momentarily overshoot the position called for by the magnitude of a pressure increase responsive to the rate of change of the pressure.

15. A pressure responsive controller, comprising in combination, a resistance, a slider movable in either direction along the resistance, a pressure sensing bellows, means connecting the bellows and slider for moving the slider in opposite directions along the resistance by amounts proportional to the magnitude of the expansion and contraction of the bellows, and said means including an expandable connection permitting the slider to shoot ahead of the position called for by the magnitude of an increase in pressure when the increase occurs at a rate of change of a certain value, and means for gradually returning the slider toward the position called for by the magnitude of the pressure increase.

16. A pressure responsive controller, comprising in combination, a resistance, a slider movable in either direction along the resistance, a pressure sensing bellows, means connecting the bellows and slider for moving the slider in opposite directions along the resistance by amounts proportional to the magnitude of the expansion and contraction of the bellows, and said means including a member movable by the bellows, means for damping the member, and an expandable connection between the slider and said member permitting the slider to move ahead of the member if the rate of change of the pressure exceeds the rate at which the damped member may move.

17. A pressure responsive controller, comprising in combination, a resistance, a slider movable in either direction along the resistance, a pressure sensing bellows, means connecting the bellows and slider for moving the slider in opposite directions along the resistance by amounts proportional to the magnitude of the expansion and contraction of the bellows, and said means including a lever member movable in opposite directions by the bellows and operative upon the slider, and a yieldable connection permitting the slider when operated by said member in a direction corresponding to an increase in pressure in the bellows to temporarily operate independently thereof and move ahead of the position called for by the member responsive to a surge of the pressure.

18. A pressure responsive controller, comprising in combination, a resistance, a slider movable in opposite directions along the resistance, a pressure sensing bellows, means connecting the bellows and slider for moving the slider in opposite directions along the resistance by amounts proportional to the magnitude of the expansion and contraction of the bellows, and said means including a lever member movable in opposite directions by the bellows and operative directly upon the slider responsive to a decrease in pressure and selectively operative upon the slider with an advantage in leverage when the pressure increases, a yieldable means normally locking the slider to said member to move therewith responsive to an increase in pressure, and a member normally movable with said lever member but damped to lag the member when the rate of movement of the lever member upon an increase of the pressure exceeds the permissible speed of the damped member thereby causing the slider to move independently of the lever member ahead of the position called for thereby, and the said yieldable means being connected between the slider and said damped member whereby the slider will return toward the position called for by the lever member as the damped member moves ahead.

19. In apparatus for controlling a condition, means including a controller responsive to a change in said condition to normally initiate a correcting effect directly according to a change in either direction in said condition, and means embodied in said controller for initiating an overcorrecting effect upon the condition in addition to said previously named corrective effect when the rate of change thereof exceeds a predetermined value in a predetermined direction, said last-named overcorrecting means being ineffective when said condition changes in the opposite direction.

20. Apparatus for controlling a variable condition, comprising in combination, electrical means for regulating said condition, a variable impedance controller responsive to a change in the condition and operative to vary said impedance dependent upon the magnitude of said change so as normally to control said electrical means directly according to the condition, and means forming a part of said controller responsive in one direction only to a rate of change of a condition greater than a predetermined value to initiate momentarily an additional change in the value of said impedance proportional to the amount the rate of change exceeds the predetermined value.

21. A condition responsive controller of the character described comprising a variable impedance, a condition responsive device having a portion movable in accordance with the value of the condition to which said device responds, means connecting said movable element to said impedance to vary the same in either direction from a certain value in accordance with the magnitude of a change in the value of said condition, and means associated with said connecting means and effective only when said condition is changing in one direction to cause said impedance to be varied an additional amount dependent upon the rate of change of the condition.

STEPHEN CRUM.
HARRY W. SANDHOFF.

REFERENCES CITED

The following references are of record in the file of this patent:

UNITED STATES PATENTS

| Number | Name | Date |
|---|---|---|
| 1,240,531 | Banner | Sept. 18, 1917 |
| 2,005,883 | Ashbaugh | June 25, 1935 |
| 2,021,757 | Umansky | Nov. 19, 1935 |
| 2,023,084 | Kovalsky | Dec. 3, 1935 |
| 2,162,490 | Mikina | June 13, 1939 |
| 2,165,043 | Fountain | July 4, 1939 |
| 2,374,708 | Shoults | May 1, 1945 |
| 2,405,413 | Edwards | Aug. 6, 1946 |